US012222662B2

(12) United States Patent
Nishimura et al.

(10) Patent No.: US 12,222,662 B2
(45) **Date of Patent: *Feb. 11, 2025**

(54) COMPONENT MOVEMENT MECHANISM FOR AN IMAGE FORMING APPARATUS

(71) Applicant: Brother Kogyo Kabushiki Kaisha, Nagoya (JP)

(72) Inventors: Yoh Nishimura, Nagoya (JP); Shougo Sato, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,938

(22) Filed: Jun. 29, 2023

(65) Prior Publication Data

US 2024/0069464 A1 Feb. 29, 2024

Related U.S. Application Data

(63) Continuation of application No. 17/531,845, filed on Nov. 22, 2021, now Pat. No. 11,726,417, which is a (Continued)

(30) Foreign Application Priority Data

Jul. 22, 2008 (JP) ................................ 2008-188513

(51) Int. Cl.
*G03G 15/08* (2006.01)
*G03G 21/16* (2006.01)
*G03G 21/18* (2006.01)

(52) U.S. Cl.
CPC ..... *G03G 15/0813* (2013.01); *G03G 15/0822* (2013.01); *G03G 15/0865* (2013.01); (Continued)

(58) Field of Classification Search
CPC .......... G03G 21/1821; G03G 21/1839; G03G 21/1842
See application file for complete search history.

(56) References Cited

U.S. PATENT DOCUMENTS

| | | | |
|---|---|---|---|
| 7,463,847 B2 | 12/2008 | Sato | |
| 2002/0110386 A1 | 8/2002 | Kanno et al. | |

(Continued)

FOREIGN PATENT DOCUMENTS

| | | |
|---|---|---|
| JP | 62-063945 | 3/1987 |
| JP | 62-280877 | 12/1987 |
| JP | 2006-184553 A | 7/2006 |
| JP | 2008-090121 A | 4/2008 |

OTHER PUBLICATIONS

Office Action received for counterpart Japanese Application 2008-188513 mailed Apr. 13, 2010.

*Primary Examiner* — Walter L Lindsay, Jr.
*Assistant Examiner* — Andrew V Do
(74) *Attorney, Agent, or Firm* — Banner & Witcoff, Ltd.

(57) ABSTRACT

An image forming apparatus may include a photosensitive member, a developing device including a developing roller, pressing members configured to engage with the developing device and springs configured to urge the pressing members. In some examples, each of the pressing members may be configured to contact and move the developing device between various positions based on the urging of the springs. Additionally or alternatively, various ends of a contact surface of the developing roller configured to contact developer may be disposed relative to an axis line of the developing roller and pressing surfaces of the pressing members.

20 Claims, 8 Drawing Sheets

Related U.S. Application Data continuation of application No. 16/686,530, filed on Nov. 18, 2019, now Pat. No. 11,209,745, which is a continuation of application No. 15/969,006, filed on May 2, 2018, now Pat. No. 10,496,007, which is a continuation of application No. 15/390,817, filed on Dec. 27, 2016, now Pat. No. 9,977,366, which is a continuation of application No. 15/098,370, filed on Apr. 14, 2016, now Pat. No. 9,563,171, which is a continuation of application No. 14/275,138, filed on May 12, 2014, now Pat. No. 9,341,982, which is a continuation of application No. 13/625,359, filed on Sep. 24, 2012, now Pat. No. 8,761,636, which is a continuation of application No. 12/507,278, filed on Jul. 22, 2009, now Pat. No. 8,311,451.

(52) U.S. Cl.
CPC ..... *G03G 21/1676* (2013.01); *G03G 21/1821* (2013.01); *G03G 21/1832* (2013.01); *G03G 21/1839* (2013.01); *G03G 21/1842* (2013.01); *G03G 2221/1684* (2013.01); *G03G 2221/169* (2013.01)

(56) References Cited

U.S. PATENT DOCUMENTS

| | | | |
|---|---|---|---|
| 2006/0140673 | A1 | 6/2006 | Kamimura et al. |
| 2006/0140674 | A1 | 6/2006 | Sato |
| 2006/0239711 | A1 | 10/2006 | Hymas et al. |
| 2008/0138115 | A1 | 6/2008 | Chadani et al. |
| 2009/0003876 | A1 | 1/2009 | Maeshima et al. |
| 2009/0317133 | A1 | 12/2009 | Nishimura et al. |
| 2012/0063808 | A1 | 3/2012 | Matsuda |

COMPONENT MOVEMENT MECHANISM FOR AN IMAGE FORMING APPARATUS

This application is a continuation of U.S. application Ser. No. 17/531,845 filed Nov. 22, 2021, which is a continuation of U.S. application Ser. No. 16/686,530 filed Nov. 18, 2019, issued as U.S. Pat. No. 11,209,745 on Dec. 28, 2021, which is a continuation of U.S. application Ser. No. 15/969,006 filed May 2, 2018, issued as U.S. Pat. No. 10,496,007, which is a continuation of U.S. application Ser. No. 15/390,817 filed Dec. 27, 2016, issued as U.S. Pat. No. 9,977,366 on May 22, 2018, which is a continuation of U.S. application Ser. No. 15/098,370 filed Apr. 14, 2016, issued as U.S. Pat. No. 9,563,171 on Feb. 7, 2017, which is a continuation of U.S. application Ser. No. 14/275,138, filed May 12, 2014, issued as U.S. Pat. No. 9,341,982 on May 17, 2016, which is a continuation of U.S. application Ser. No. 13/625,359, filed Sep. 24, 2012, issued as U.S. Pat. No. 8,761,636 on Jun. 24, 2014, which is a continuation of U.S. application Ser. No. 12/507,278, filed Jul. 22, 2009, issued as U.S. Pat. No. 8,311,451 on Nov. 13, 2012, entitled "Component Movement Mechanism for an Image Forming Apparatus," which claims priority from Japanese Patent Application No. 2008-188513 filed on Jul. 22, 2008. The entire subject matter of the above noted applications is hereby incorporated herein by reference.

TECHNICAL FIELD

Aspects of the invention relate to an image forming apparatus and in particular to an image forming apparatus whose usability is enhanced.

BACKGROUND

In a known image forming apparatus such as a laser printer, a plurality of developing devices each having a developing roller are detachably supported on a support tray and the support tray can be attached to and detached from the apparatus main body. The image forming apparatus enables a user to easily replace any developing device by removing the support tray from the apparatus main body.

SUMMARY

Illustrative aspects of the invention provide an image forming apparatus that can improve usability thereof when a developing device is replaced.

BRIEF DESCRIPTION OF THE DRAWINGS

In the accompanying drawings:

FIGS. 2A to 2C are drawings to describe a close position, in which FIG. 2A shows an external structure of a photosensitive unit and a developing unit, FIG. 2B is a partially enlarged view of FIG. 2A, and FIG. 2C shows an internal structure of the photosensitive unit and the developing unit;

FIGS. 3A to 3D are drawings to describe a distant position, in which FIG. 3A shows the external structure of the photosensitive unit and the developing unit, FIG. 3B is a partial enlarged view of FIG. 3A, FIG. 3C shows the internal structure of the photosensitive unit and the developing unit, and FIG. 3D is an enlarged view of a lock engagement part;

FIGS. 4A and 4B are perspective views of a developing device, in which FIG. 4A shows a state where a cover member is at an exposure position, and FIG. 4B shows a state where the cover member is at a cover position;

FIGS. 9A and 9B are schematic drawings of a developing device according to a modified exemplary embodiment of the invention, in which FIG. 9A shows a state where the cover member is at the cover position, and FIG. 9B shows the state where the developing device shown in FIG. 9A is grasped.

DETAILED DESCRIPTION

General Overview

Figure 1:
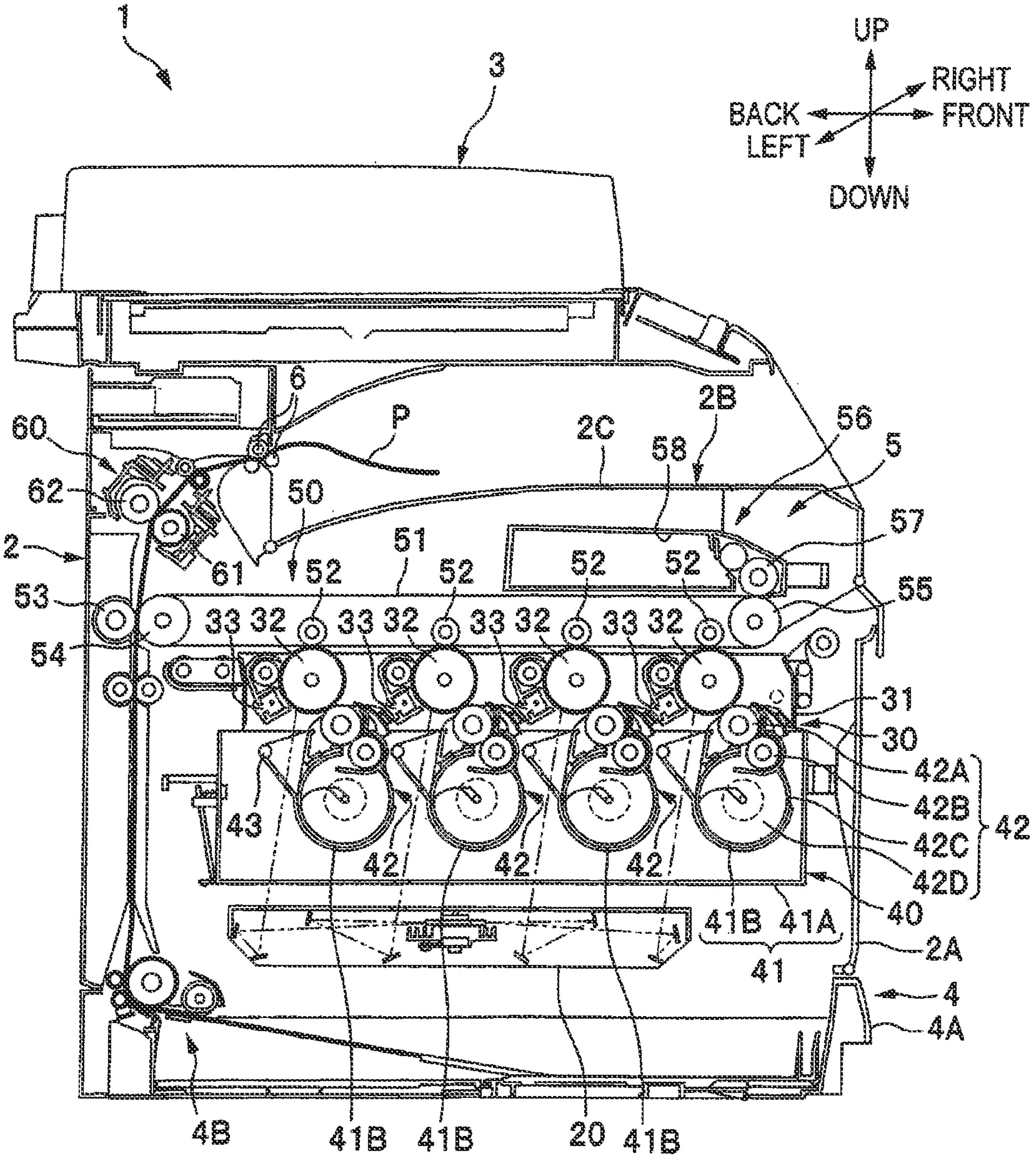
FIG. 1 is a sectional view of an image forming apparatus according to an exemplary embodiment of the invention.

In a configuration where the support tray supports the developing device with the developing roller exposed, when the user attaches or detaches the developing device to or from the support tray, or when the user attaches or detaches the support tray to or from the apparatus main body, a hand of the user, any other member, etc., may contact the developing roller. In such a case, a scratch may be made on the developing roller, or sebum of a hand, etc., may be put on the developing roller, and supply of developer to a photosensitive member may be affected. Further, there may be caused a problem of depositing developer on the developing roller on a hand, any other member, etc., and making the hand, the member, etc., dirty.

Thus, the user handling the image forming apparatus needs to replace the developing device while taking care to avoid touching of a hand or any other member on the developing roller. However, it is not convenient for the user.

Therefore, illustrative aspects of the invention provide an image forming apparatus that can enhance usability thereof when a developing device is replaced.

According to one illustrative aspect of the invention, there is provided an image forming apparatus comprising: an apparatus main body; a photosensitive member; a plurality of developing devices each comprising a developing roller that supplies developer to the photosensitive member; a support member, which detachably supports the plurality of developing devices, and which is able to be drawn out from the apparatus main body; and a developing device move mechanism that moves each of the developing devices to a close position where the developing roller is brought close to the photosensitive member and a distant position where the developing roller is brought away from the photosensitive member rather than at the close position, wherein each of the developing devices comprises a cover member that is movable between a cover position and an exposure position, the cover member covering the developing roller at the cover position, and the cover member exposing the developing roller at the exposure position, and wherein the image forming apparatus further comprises a cover member move mechanism that moves the cover member, the cover member move mechanism moving the cover member from the cover position to the exposure position in association with movement of the developing roller from the distant position to the close position by the developing device move mechanism, and the cover member move mechanism moving the cover member from the exposure position to the cover position in association with movement of the developing roller from the close position to the distant position by the developing device move mechanism.

According to another illustrative aspect of the invention, there is provided an image forming apparatus comprising: a photosensitive member; a developing device comprising: a developing roller that supplies developer to the photosensitive member; and a cover member that is movable between a cover position and an exposure position, the cover member covering the developing roller at the cover position, and the cover member exposing the developing roller at the exposure position; a developing device move mechanism that moves the developing device to a close position where the developing roller is brought close to the photosensitive member and a distant position where the developing roller is brought away from the photosensitive member rather than at the close position; and a cover member move mechanism that moves the cover member, the cover member move mechanism moving the cover member from the cover position to the exposure position in association with movement of the developing roller from the distant position to the close position by the developing device move mechanism, and the cover member move mechanism moving the cover member from the exposure position to the cover position in association with movement of the developing roller from the close position to the distant position by the developing device move mechanism.

According to the illustrative aspects of the invention, when the developing roller is at the distant position where it is made possible to draw out the support member from the apparatus main body, the cover member provided on the developing device is at the cover position covering the developing roller. Thus, when the user draws out the support member or when the user places the drawn-out support member, the user, any other member, etc., can be prevented from coming in contact with the developing roller. When the user detaches the developing device from the support member, the cover member is also at the cover position, so that the user, any other member, etc., can be prevented from coming in contact with the developing roller. Accordingly, it becomes unnecessary for the user handling the image forming apparatus to take care to avoid touching of a hand or any other member on the developing roller and the developing device can be easily replaced.

Further, movement of the developing roller between the distant position and the close position and movement of the cover member between the cover position and the exposure position are associated with each other. Thus, in a single step, while the developing roller is brought close to the photosensitive member, the cover member can be opened and the developing roller can be exposed and while the developing roller is brought away from the photosensitive member, the cover member can be closed and the developing roller can be covered. Accordingly, operation when the developing device is replaced can be simplified and the time required for replacing the developing device (the time until image formation is made possible) can be shortened.

According to the image forming apparatus of the invention, when the user draws out or places the support member or when the user attaches or detaches the developing device, the user, any other member, etc., can be prevented from coming in contact with the developing roller, so that the usability when the developing device is replaced can be enhanced.

EXEMPLARY EMBODIMENTS

Exemplary embodiments of the invention will now be described with reference to the drawings.

(Color Multifunction Device)

As shown in FIG. 1, a color multifunction device 1 (one example of an image forming apparatus) includes a main body case 2 (one example of an apparatus main body) and a flat bed scanner 3 that is provided on the top of the main body case 2. The color multifunction device 1 includes a feeder unit 4 for feeding a sheet P and an image forming unit 5 for forming an image on the fed sheet P in the main body case 2.

Incidentally, in the following description, the directions are those based on the user using the color multifunction device. That is, in FIG. 1, the right of the plane of the figure is “back,” the left of the plane of the figure is “front,” the front of the plane of the figure is “left,” and the back of the plane of the figure is “right.” The up and down direction of the plane of the figure is “up and down” direction.

A front cover 2A that can rotate back and forth with a lower part as a support is provided on the front of the main body case 2. An upper cover 2B that can rotate up and down with a back part as a support is provided at an upper part of the main body case 2. The top face of the upper cover 2B serves as a sheet discharge tray 2C for storing sheets P discharged from the main body case 2.

The flat bed scanner 3 is a document reader having a known configuration and generates image data by applying light to a document and reading an image at the copying time.

The feeder unit 4 is provided at the bottom of the main body case 2 and includes a sheet feed cassette 4A detachably placed in the main body case 2 and a sheet feed mechanism 4B for feeding a sheet P from the sheet feed cassette 4A to the image forming unit 5. In the feeder unit 4, sheets P in the sheet feed cassette 4A are fed one sheet at a time by the sheet feed mechanism 4B to the upper image forming unit 5 (between an intermediate transfer belt 51 and a secondary transfer roller 53).

The upper image forming unit 5 includes an exposure unit 20, a photosensitive unit 30, a developing unit 40, a transfer unit 50, and a fixing unit 60.

The exposure unit 20 is placed above the feeder unit 4 and includes a known laser emission unit, a known polygon mirror, a plurality of known lenses, a plurality of known reflecting mirrors (not shown), etc. In the exposure unit 20, laser light emitted from the laser emission unit corresponding to each color is reflected on the polygon mirror and the reflecting mirror and passes through the lenses and then is scanned at high speed over the surface of a photosensitive drum 32.

The photosensitive unit 30 is placed above the exposure unit 20 (between the developing unit 40 and the transfer unit 50) and includes four photosensitive drums 32 (one example of a photosensitive member) placed in parallel in the back and forth direction and chargers 33 provided in a one-to-one correspondence with the photosensitive drums 32.

The detailed configuration of a photosensitive support frame 31 will be described later.

The developing unit 40 is placed between the exposure unit 20 and the photosensitive unit 30 and includes a support member 41 and four developing devices 42.

The support member 41 includes a developing device support frame 41A forming an outer frame and developing device holders 41B for detachably supporting the developing devices 42. The developing device support frame 41A can be drawn out from the main body case 2 (see FIG. 7). Each developing device holder 41B can be swung relative to the developing device support frame 41A as a support shaft 43 is supported rotatably on each wall in the right-left direction of the developing device support frame 41A.

Each of the developing devices 42 includes a developing roller 42A for supplying developer to the photosensitive drums 32, a supply roller 42B, and a developer accommodation unit 42D for accommodating the developer in a developing device case 42C as an example of developing device main body forming an outer frame. Incidentally, toner is one example of the developer. The developing roller 42A is placed above the developer accommodation unit 42D in a state in which the developing device 42 is attached to the support member 41 (developing device holder 41B). The developing devices 42 differ only in the color of the developer accommodated in the developer accommodation unit 42D and are of the same configuration.

In each developing device 42, the developer in the developer accommodation unit 42D is supplied by an agitator (reference numeral omitted) to the supply roller 42B and further is supplied from the supply roller 42B to the developing roller 42A and is carried thereon.

The detailed configuration of the developing unit 40 will be described later.

The transfer unit 50 is placed above the photosensitive unit 30 and includes an intermediate transfer belt 51, four primary transfer rollers 52, a secondary transfer roller 53, a driving roller 54, a driven roller 55, and a cleaning unit 56.

The intermediate transfer belt 51 is an endless belt and is stretched between the driving roller 54 and the driven roller 55 placed in parallel at a distance from each other in the back and forth direction. The photosensitive drums 32 are opposed to and in contact with the lower part of the outer peripheral surface of the intermediate transfer belt 51, and the secondary transfer roller 53 is opposed to and in contact with the back of the outer peripheral surface.

The primary transfer rollers 52 are in contact with the inner peripheral surface of the intermediate transfer belt 51 and are opposed to the photosensitive drums 32 so as to sandwich the intermediate transfer belt 51 between the primary transfer rollers 52 and the photosensitive drums 32. The secondary transfer roller 53 is opposed to the driving roller 54 so as to sandwich the intermediate transfer belt 51 therebetween. At the transferring time, a transfer bias is applied to the primary transfer roller 52 and the secondary transfer roller 53.

The cleaning unit 56 is placed above the front of the intermediate transfer belt 51 and removes the remaining developer on the intermediate transfer belt 51 with a cleaning roller 57 and stores the developer in a developer storage unit 58.

The fixing unit 60 is placed above the back of the transfer unit 50 (above the secondary transfer roller 53 and the driving roller 54) and includes a heating roller 61 having a known configuration and a pressing roller 62 opposed to the heating roller 61 for pressing the heating roller 61.

In the image forming unit 5, first the surface of each photosensitive drum 32 is uniformly charged by each charger 33 and then is exposed to laser light emitted from the exposure unit 20. Accordingly, the potential of the exposed portion lowers and an electrostatic latent image is formed on each photosensitive drum 32 based on image data.

Next, when the developing roller 42A and the photosensitive drum 32 are opposed to and come in contact with each other, the developer carried on the developing roller 42A is supplied to the electrostatic latent image formed on the photosensitive drum 32. Accordingly, the developer is selectively carried on the photosensitive drum 32 and the electrostatic latent image is visualized to form a developer image.

The developer images formed on the photosensitive drums 32 are transferred onto the intermediate transfer belt 51 as they are superposed in order by the action of the primary transfer rollers 52 to which a transfer bias is applied. When a sheet P supplied to the image forming unit 5 passes through the nip between the intermediate transfer belt 51 the secondary transfer roller 53, the developer images of colors transferred onto the intermediate transfer belt 51 are transferred onto the sheet P by the action of the secondary transfer roller 53 to which a transfer bias is applied.

The sheet P with the developer image transferred thereon is conveyed to the fixing unit 60 and passes through the nip between the heating roller 61 and the pressing roller 62, whereby the developer image is thermally fixed. The sheet P with the developer image thermally fixed thereon is discharged from the main body case 2 to the outside by the discharge roller 6 and is stored on the sheet discharge tray 2C.

(Photosensitive Support Frame)

Next, the detailed configuration of the photosensitive support frame 31 will be discussed with reference to FIGS. 2A to 3D.

Figure 2A:
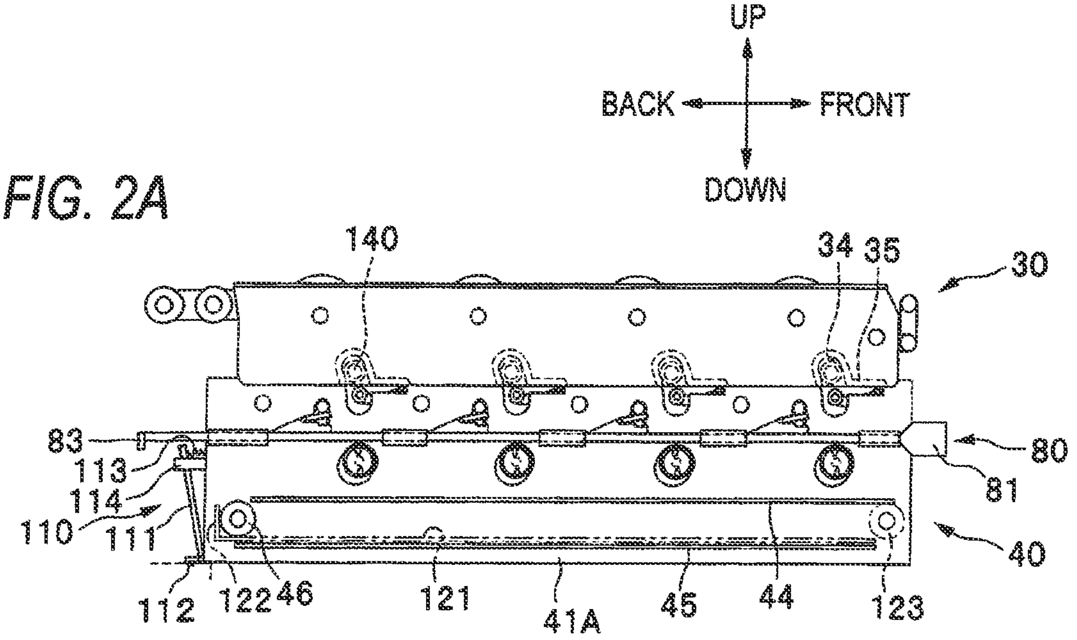
Figure 2B:
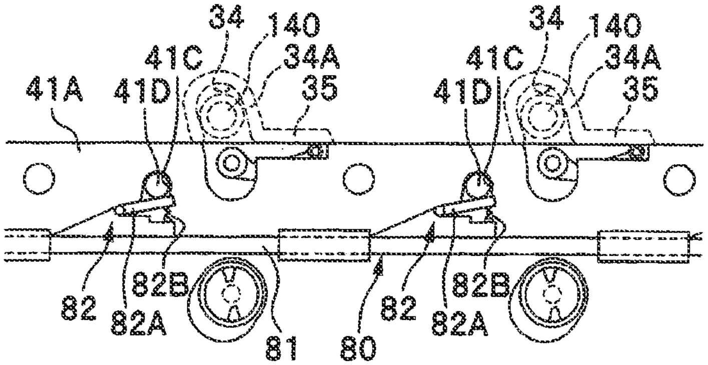
Figure 2C:
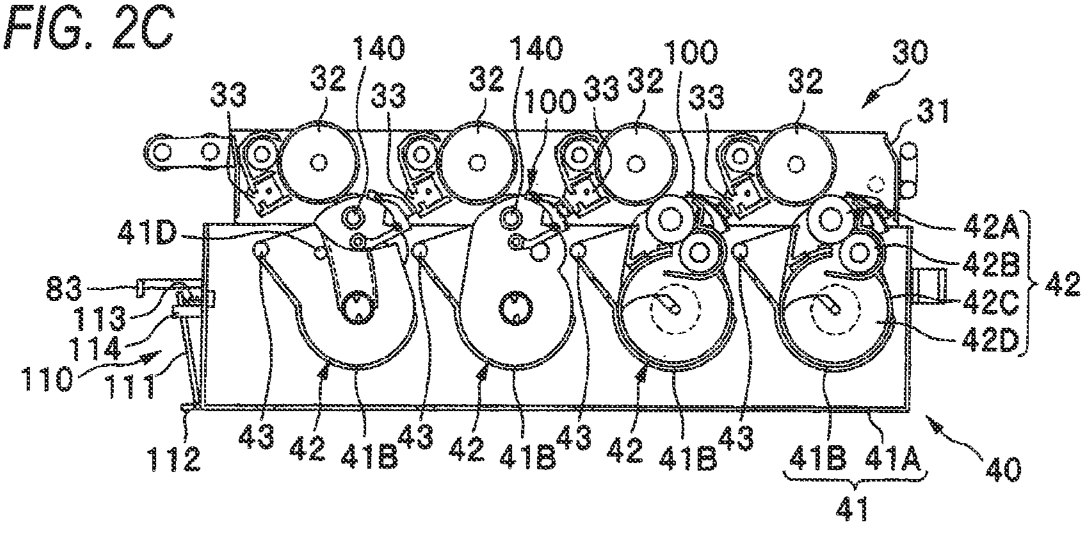

As shown in FIG. 2C, the photosensitive support frame 31 is formed like a frame with the top and the bottom opened and has side plates (reference numeral not shown and only one side plate shown) opposed in the right-left direction for supporting the photosensitive drums 32 and the chargers 33. As shown in FIGS. 2A and 2B, the photosensitive support frame 31 is formed with four grooves 34 and four abutment parts 35 with equal spacing corresponding to the photosensitive drums 32 in a lower part of the inner face of the side plates opposed in the right-left direction.

The groove 34 is formed of a wall 34A shaped like U letter (inverse U shaped) projecting toward the inside in the right-left direction from the side plates opposed in the right-left direction and dented toward the top from the bottom. The groove 34 is a portion for engaging the developing device 42 (a roller shaft 140 of the developing roller 42A) and guiding a movement of the developing device 42 moving between the close position shown in FIGS. 2A to 2C and the distant position shown in FIGS. 3A to 3D and also positioning the developing device 42 relative to the photosensitive drum 32.

The abutment part 35 is formed integrally with the wall 34A forming the groove 34 and extends toward the front from the front end portion of the wall 34A, the lower end of the inner face of the side plates opposed in the right-left direction. The abutment part 35 and a cover member operation part 104 (described later) are one example of a cover member move mechanism.

(Developing Unit)

Next, the detailed configuration of the developing unit 40 will be discussed.

The developing unit 40 further includes an operation bar 80 (one example of a developing device move mechanism) shown in FIG. 2A and a lock member 110 in addition to the above-mentioned support member 41 and developing devices 42. The configuration of each component (part), etc., will be discussed below in detail:

As shown in FIG. 2C, the support member 41 includes the developing device support frame 41A and the developing device holder 41B supported swingably relative to the developing device support frame 41A.

Figure 3A:
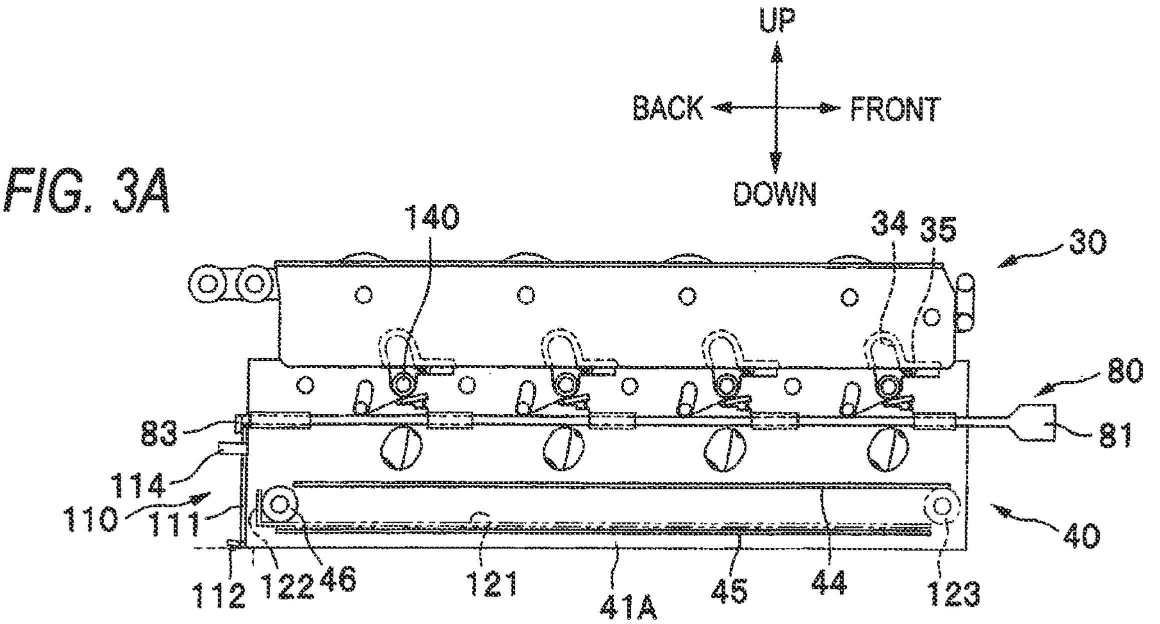
Figure 3B:
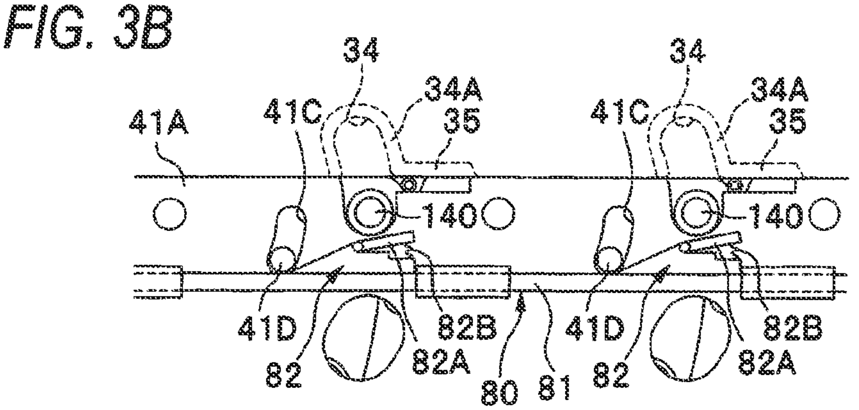
Figure 3D:
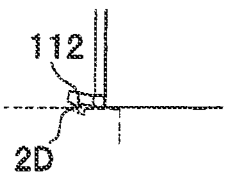

The developing device support frame 41A is formed substantially like a box with the top opened. As shown in FIG. 3B, the developing device support frame 41A is formed with four through holes 41C each of an oblong shape at an upper part of each wall in the right-left direction. As shown in FIG. 3A, on the outer face of each wall in the right-left direction of the developing device support frame 41A, a pair of guides 44 and 45 extending in the back and forth direction is provided at a lower part, and a roller 46 is provided at the back ends of the guides 44 and 45.

Provided in the main body case 2 are a guide 121 extending along the guide 45, a stopper 122 formed at the back end of the guide 121 for regulating a backward movement of the roller 46, and a roller 123 placed above the front end of the guide 121.

The developing device holder 41B is formed with an operation part 41D projecting from the through hole 41C toward the outside in the right-left direction, as shown in FIGS. 2B and 2C. The operation part 41D is a portion for swinging the developing device holder 41B relative to the developing device support frame 41A as the operation part 41D is moved substantially up and down in the through hole 41C of an oblong shape with the operation bar 80 (described later).

The operation bar 80 is a member for moving each developing device 42 between the close position shown in FIGS. 2A to 2C and the distant position shown in FIGS. 3A to 3D. As shown in FIGS. 2A and 2B, the operation bar 80 is provided on the outer face of each wall in the right-left direction of the developing device support frame 41A and includes a bar main body 81 and four inclination members 82.

The bar main body 81 is a rod-like member extending in the back and forth direction and is supported movably in the back and forth direction relative to the developing device support frame 41A. The bar main body 81 on both left and right sides is joined at the front of the developing device support frame 41A can move in one piece in the back and forth direction. An unlock part 83 having a lower end projecting downward from the bar main body 81 is provided at the back end of the bar main body 81.

The inclination members 82 are provided above the bar main body 81 with spacing to allow them to engage the operation parts 41D and have each an upper face falling from the front to the back to form an inclining face (reference numeral omitted). The substantial front half of the inclination face is formed of a tilt member 82A that can tilt up and down with the back end as the center. The tilt member 82A is urged upward from below by a spring 82B.

The function of the operation bar 80 will be discussed.

At the image forming time, the operation part 41D of each developing device holder 41B and the corresponding inclination member 82 of the operation bar 80 engage each other, as shown in FIGS. 2A to 2C. Specifically, the operation part 41D of each developing device holder 41B is placed on the tilt member 82A of the corresponding inclination member 82 and is urged upward by the spring 82B. Accordingly, the developing device 42 attached to each developing device holder 41B is urged toward the photosensitive drum 32. Thus, the developing roller 42A is brought close to the photosensitive drums 32.

Figure 3C:
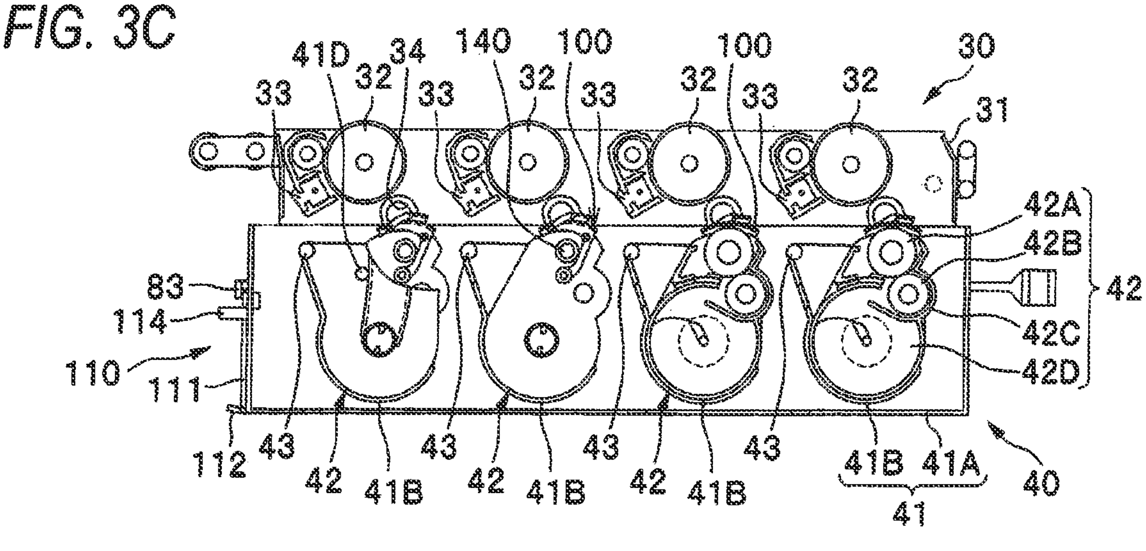

At the replacing time, etc., of the photosensitive unit 30 or the developing device 42 (described later), the operation bar 80 is pulled toward the front as shown in FIGS. 3A to 3C. Then, the engagement of the operation part 41D of each developing device holder 41B and the corresponding inclination member 82 of the operation bar 80 is released.

Specifically, as the operation bar 80 is pulled toward the front, the bar main body 81 moves forward relative to the developing device support frame 41A and thus each inclination member 82 provided above the bar main body 81 also moves forward from the lower part of the operation part 41D of the corresponding developing device holder 41B. Accordingly, nothing supports the operation part 41D from the lower part. Thus, each developing device holder 41B (developing device 42) swings downward under its own weight and the developing roller 42A moves to the distant position from the photosensitive drum 32 from the close position.

Conversely, to move the developing device 42 from the distant position to the close position, the operation bar 80 is pushed backward as shown in FIGS. 2A to 2C. Then, the bar main body 81 moves backward relative to the developing device support frame 41A and thus each inclination member 82 also moves backward. At this time, each operation part 41D is placed on the tilt member 82A along the inclination face of the corresponding inclination member 82 and is urged upward by the spring 82B. Accordingly, the developing device 42 attached to each developing device holder 41B is urged toward the photosensitive drum 32. Thus, the developing roller 42A moves to the close position.

A movement of the developing device 42 is guided as the roller shaft 140 (described later) engages the groove 34 provided on the photosensitive support frame 31. The developing roller 42A is positioned relative to the photosensitive drum 32 as the roller shaft 140 engages the groove 34 particularly when the developing device 42 is at the close position. That is, the roller shaft 140 functions as a cover member abutment part.

The lock member 110 is provided at the back of the developing device support frame 41A as shown in FIG. 2A, FIG. 3A, etc. The lock member 110 includes a rod-like member 111 that can swing back and forth with the lower end as the center, a hook 112 formed at the lower end of the rod-like member 111, a spring 113 for urging the upper end of the rod-like member 111 in a direction away from the developing device support frame 41A (backward), and a holding member 114 for holding the top of the rod-like member 111 and preventing the rod-like member 111 from dropping off from the developing device support frame 41A.

The lock member 110 disables a movement of the developing unit 40 relative to the main body case 2 as a claw of the hook 112 engages a lock engagement part 2D (see FIG. 3D) provided in the main body case 2 in a state shown in FIGS. 2A to 2C in which the developing unit 40 is placed in the main body case 2 and the operation bar 80 is pushed backward.

In contrast, in a state shown in FIGS. 3A to 3D in which the operation bar 80 is pulled forward, the unlock part 83 engages the upper end of the rod-like member 111 and swings the upper end of the rod-like member 111 forward, so that the engagement of the claw of the hook 112 and the lock engagement part 2D (see FIG. 3D) is released. Accordingly, the developing unit 40 is enabled to move (be drawn) relative to the main body case 2 (see FIG. 7).

The developing device 42 includes the developing roller 42A, the supply roller 42B, and the developer accommodation unit 42D in the developing device case 42C. The developing device 42 further includes a cover member 100, a grip 130, and the roller shaft 140 as an example of a cover member abutment unit.

Figure 4A:
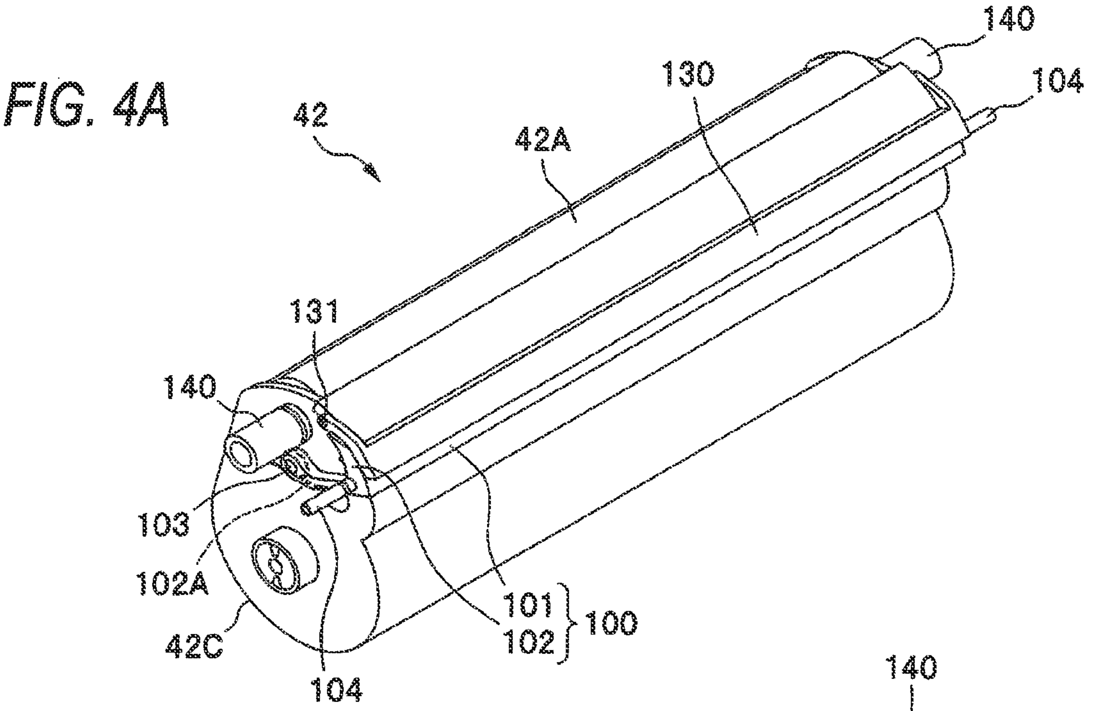
Figure 4B:
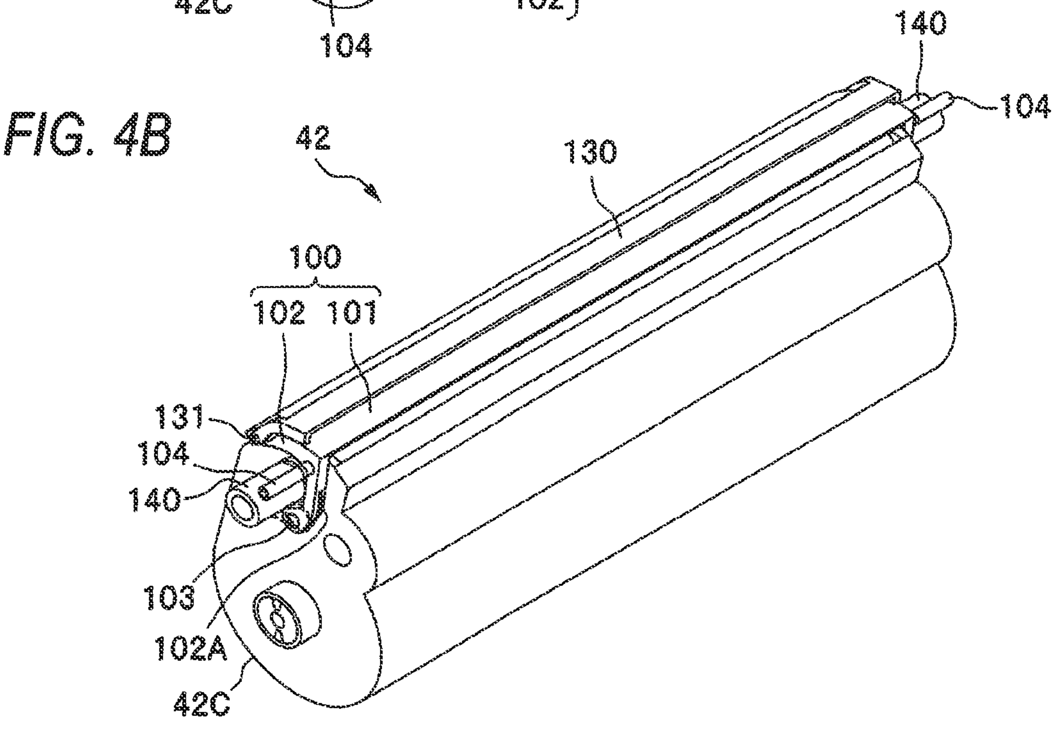

The cover member 100 is a member for protecting the developing roller 42A and can move between a cover position for covering the developing roller 42A (see FIG. 4B) and an exposure position for exposing the developing roller 42A (see FIG. 4A). More particularly, the cover member 100 is made up of a cover 101 substantially shaped like a circular ark on a side view for protecting the developing roller 42A and an arm 102 substantially shaped like letter L on a side view formed integrally with the cover 101 at both ends in the right-left direction of the cover 101.

The arm 102 has one end portion rotatably attached to the developing device case 42C through a rotation shaft 103 below the roller shaft 140. Accordingly, the cover 101 (cover member 100) can move between the cover position and the exposure position as the cover 101 (cover member 100) rotates along the circumferential direction of the developing roller 42A through the rotation shaft 103 relative to the developing device case 42C. The arm 102 (cover member 100) is urged to the cover position at all times by an urging member 102A.

The arm 102 includes the cover member operation part 104 projecting to the outside in the right-left direction (axial direction of the developing roller 42A) in a bend portion substantially shaped like letter L. The cover member operation part 104 and the abutment part 35 mentioned above configures the cover member move mechanism. The function of the cover member move mechanism (the abutment part 35 and the cover member operation part 104) will be described later.

The grip 130 is a part grasped by the user when the user attaches the developing device 42 to the support member 41. The grip 130 is shaped substantially like letter U on a plan view and has both end portions rotatably supported on the cover member 100 (opposite end portion of the arm 102) through a support part 131. The grip 130 is urged against the cover member 100 (cover 101) at all times according to a known configuration using an urging member, etc. To grasp the developing device 42, the user rotates the grip 130 upward (see FIG. 7).

A recess part (reference numeral omitted) to form a gap between the grip 130 and the cover member 100 (cover 101) is provided at the front end of the grip 130. Thus, the user can easily rotate the grip 130 by hooking a finger, a nail, etc., in the gap (recess part).

The roller shaft 140 is a shaft of the developing roller 42A projecting from both left and right side faces of the developing device case 42C to the outside in the right-left direction. When the cover member 100 moves from the exposure position to the cover position, the cover member 100 abuts the roller shaft 140. A movement of the cover member 100 is regulated as the cover member 100 abuts the roller shaft 140.

(Cover Member Move Mechanism)

Figures 5A, 5B, 5C:
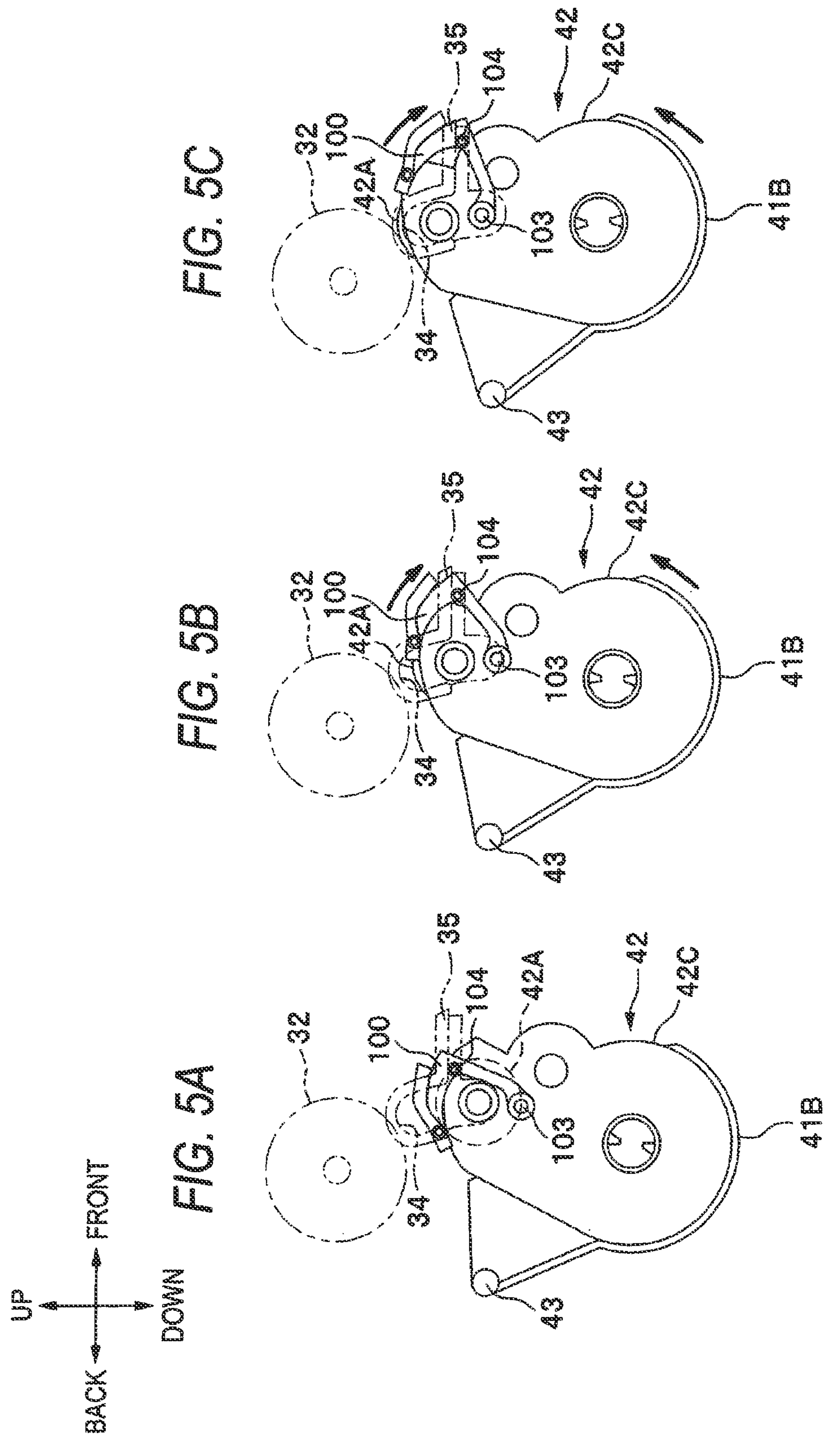
FIGS. 5A to 5C are drawings to describe a function of a cover member move mechanism.

Next, the function of the cover member move mechanism (the abutment part 35 and the cover member operation part 104) will be discussed. FIGS. 5A to 5C are drawings to describe the function of the cover member move mechanism.

As shown in FIGS. 3C and 5A, when the developing device 42 is at the distant position, the cover member 100 urged against the cover position at all times is at the cover position covering the developing roller 42A. As the operation bar 80 is pushed backward, the developing device holder 41B (developing device 42) swings upward with the support shaft 43 as the center from the distant position to the close position as shown in FIGS. 5B and 5C.

At this time, the upward swinging force of the developing device holder 41B (developing device 42) causes the cover member operation part 104 first to abut the back end of the abutment part 35 and further to move forward along the lower face of the abutment part 35. Accordingly, the cover member 100 including the cover member operation part 104 rotates clockwise (in the arrow direction) in FIGS. 5A to 5C relatively to the developing device case 42C. Thus, when the developing device 42 shown in FIG. 5C reaches the close position, the cover member 100 moves from the cover position completely to the exposure position.

In contrast, as shown in FIGS. 2C and 5C, when the developing device 42 is at the close position, the cover member 100 is at the exposure position exposing the developing roller 42A to bring the photosensitive drum 32 and the developing roller 42A close to each other. As the operation bar 80 is pulled forward, the developing device holder 41B (developing device 42) swings downward with the support shaft 43 as the center from the close position to the distant position as shown in FIGS. 5B and 5A.

At this time, the cover member operation part 104 moves backward along the lower face of the abutment part 35 from the front end side of the abutment part 35 by the downward swinging force of the developing device holder 41B (developing device 42) and the action of the urging member 102A urging the cover member 100 against the cover position at all times. Accordingly, the cover member 100 including the cover member operation part 104 rotates counterclockwise in FIGS. 5A to 5C relatively to the developing device case 42C. Thus, when the developing device 42 shown in FIG. 5A reaches the distant position, the cover member 100 moves from the exposure position to the cover position.

As described above, the cover member move mechanism (the abutment part 35 and the cover member operation part 104) can move the cover member 100 from the cover position to the exposure position in association with movement of the developing roller 42A from the distant position to the close position with the operation bar 80 and can move the cover member 100 from the exposure position to the cover position in association with movement of the developing roller 42A from the close position to the distant position.

(Operation of Multifunction Device)

Figure 6:
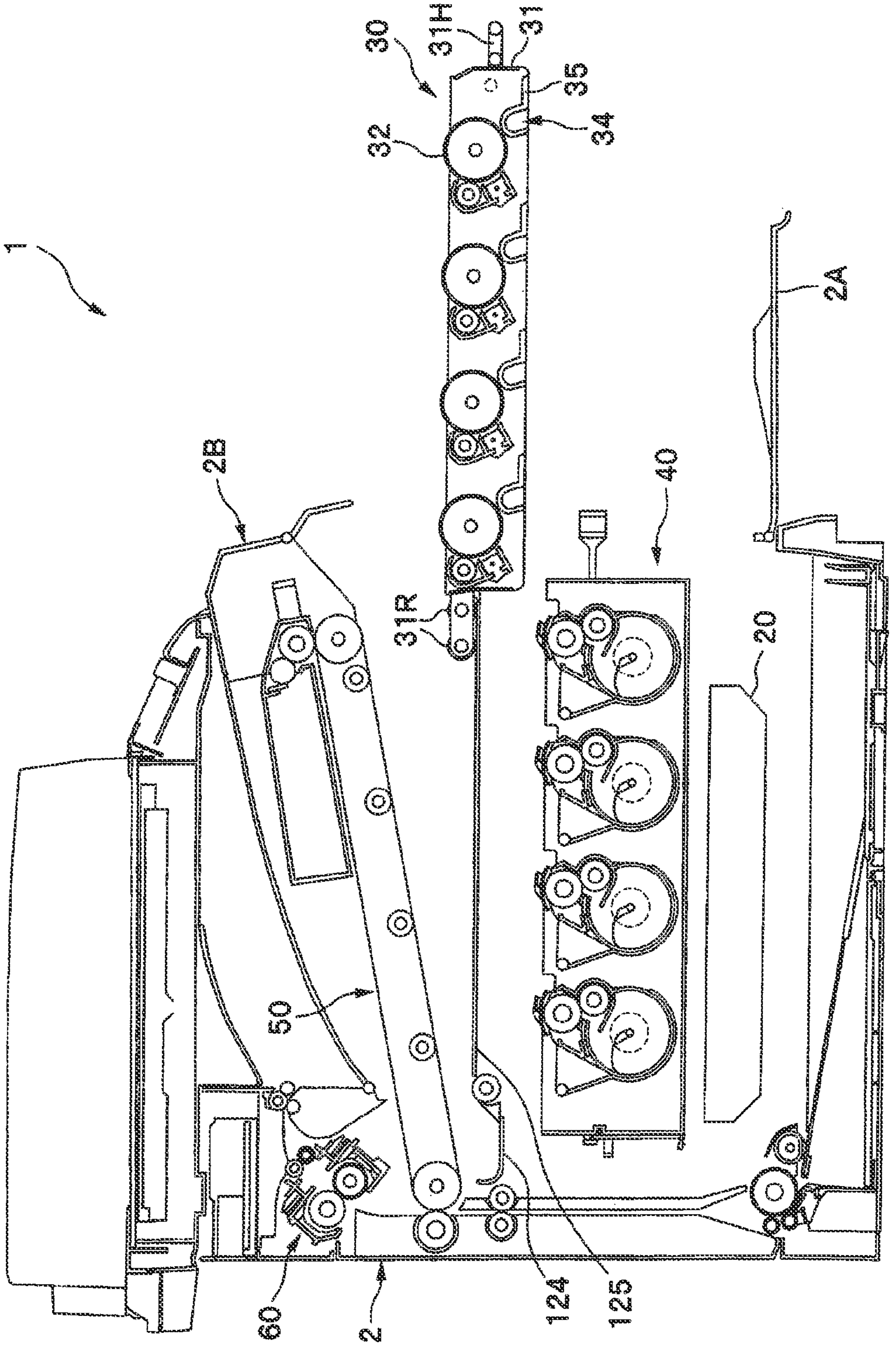
FIG. 6 is a drawing to show a state of replacing the photosensitive unit.
Figure 7:
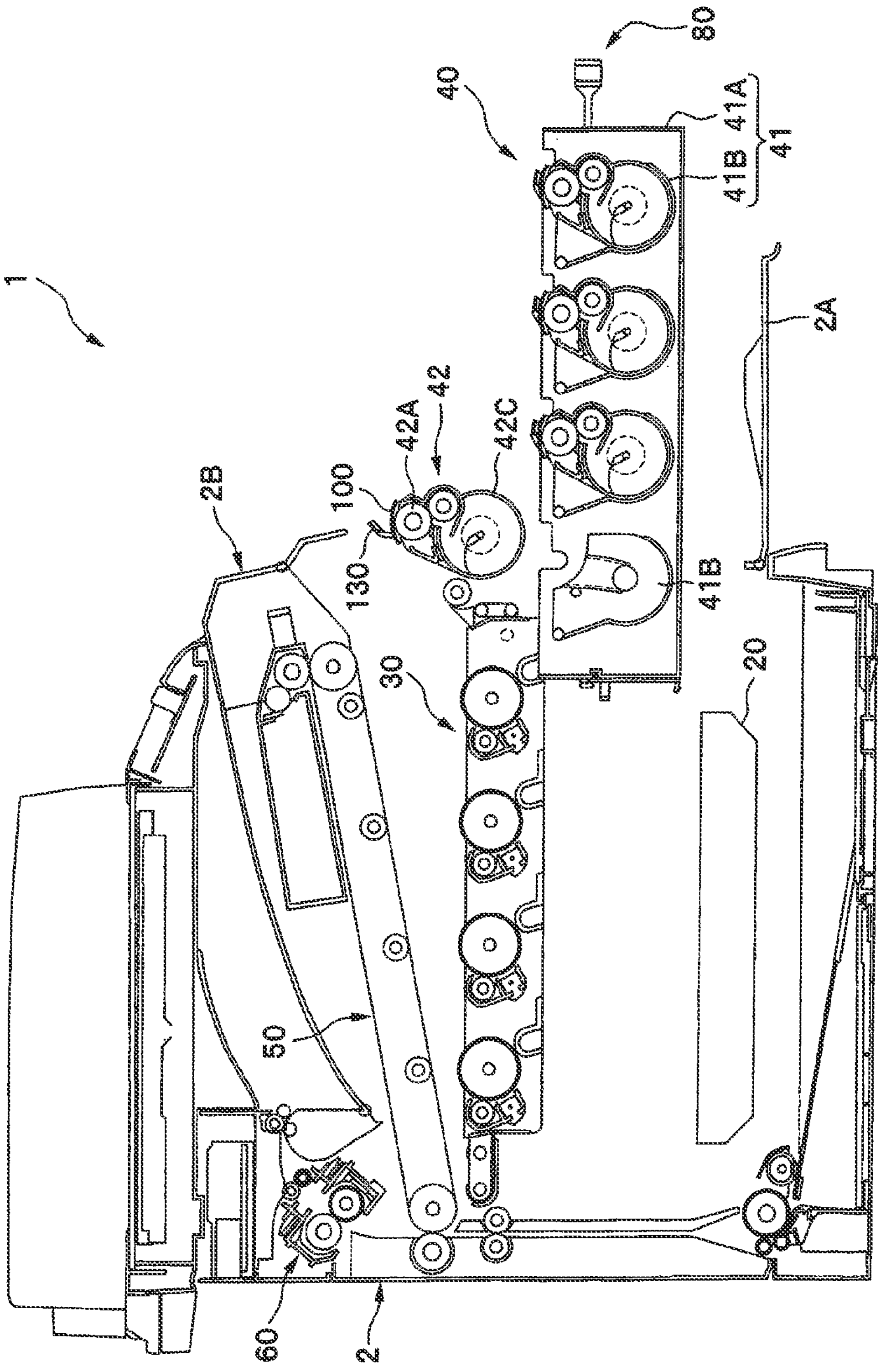
FIG. 7 is a drawing to show a state of replacing the developing device.

Next, the operation of the color multifunction device 1, specifically the operation when the photosensitive unit 30 or the developing device 42 is replaced will be discussed. FIG. 6 is a drawing to show a state at the replacing time of the photosensitive unit and FIG. 7 is a drawing to show a state at the replacing time of the developing device.

As shown in FIG. 6, first the user rotates the upper cover 2B upward and opens it and next rotates the front cover 2A forward and opens it, thereby exposing the photosensitive unit 30 and the developing unit 40.

To replace the photosensitive unit 30, the user raises a handle 31H provided on the front of the photosensitive support frame 31 and pulls the handle 31H forward. Then, a roller 31R provided at the back end of the photosensitive support frame 31 is put on a guide 125 from a stopper 124 provided in the main body case 2 and rolls on the guide 125, whereby the photosensitive unit 30 moves forward. Finally, the user removes the photosensitive unit 30 from the main body case 2 and places a new photosensitive unit 30 in the main body case 2. The photosensitive unit 30 can be thus replaced.

To replace the developing device 42, first the user pulls the operation bar 80 forward for moving each developing device 42 from the close position to the distant position. At this time, the cover member 100 moves from the exposure position to the cover position in association with movement of each developing device 42 from the close position to the distant position. Then, as shown in FIG. 7, the user more strongly pulls the operation bar 80 forward. Accordingly, the roller 46 shown in FIG. 2A, etc., rolls on the guide 121 and while the guide 44 rolls the roller 123, the developing unit 40 (support member 41) is drawn out from the main body case 2.

The user rotates the grip 130 upward, grasps it, removes the developing device 42 from the developing device holder 41B, and attaches a new developing device 42 to the developing device holder 41B and then places the developing unit 40 in the main body case 2. Then, the user pushes the operation bar 80 backward for moving each developing device 42 from the distant position to the close position. At this time, the cover member 100 moves from the cover position to the exposure position in association with movement of each developing device 42 from the distant position to the close position. The developing device 42 can be thus replaced.

Last, the user rotates the front cover 2A upward, closes it, rotates the upper cover 2B downward, and closes it. Replacing the photosensitive unit 30 or the developing device 42 is now complete.

(Developing Device)

Next, a desirable configuration of the developing device 42 will be discussed.

Figure 8A:
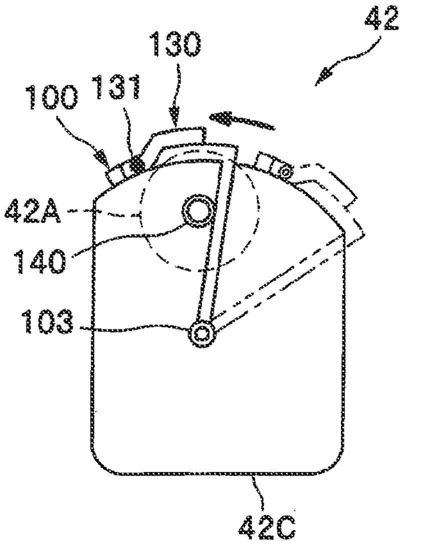
FIG. 8A is a schematic drawing of the developing device where the cover member is at the cover position.

As shown in FIG. 8A, the developing device 42 of the exemplary embodiment includes the developing roller 42A for supplying developer to the photosensitive drum 32, the cover member 100 that can move between the cover position and the exposure position as it rotates along the circumferential direction of the developing roller 42A through the rotation shaft 103 relative to the developing device case 42C, the grip 130 supported on the cover member 100 through the support part 131, and the roller shaft 140 that the cover member 100 abuts when the cover member 100 moves from the exposure position to the cover position.

The cover member 100 can rotate between the cover position indicated by the solid line and the exposure position indicated by the chain line with the rotation shaft 103 as the center. The cover member 100 abuts the roller shaft 140, whereby a movement of the cover member 100 in a direction toward the cover position from the exposure position (counterclockwise in FIGS. 8A and 8B) is regulated.

Figure 8B:
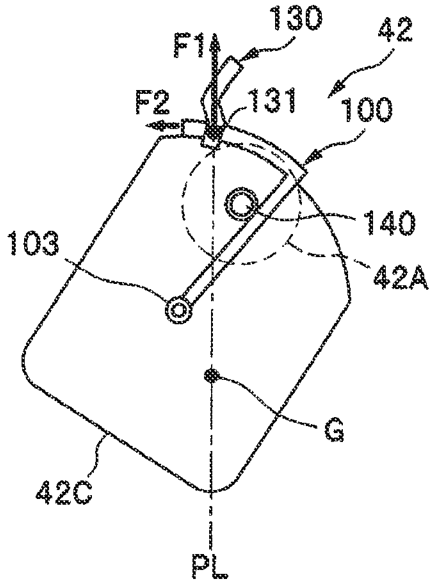
FIG. 8B shows a state where the developing device shown in FIG. 8A is grasped.

In the developing device 42, as shown in FIG. 8B, it is desirable that the rotation shaft 103 should be placed on the move direction side to the cover position from the exposure position of the cover member 100 from a plane PL connecting center of gravity G of the developing device 42 and the support part 131 viewed from the axial direction of the developing roller 42A, namely, at the left of the plane PL in FIG. 8B.

In the above-described developing device 42, when the user grasps the grip 130 and lifts up the developing device 42, an upward force F1 acts on the support part 131 as shown in FIG. 8B. At this time, the rotation shaft 103 is positioned at the left of the plane PL and the cover member 100 abuts the roller shaft 140 and thus a counterclockwise force F2 acts on the cover member 100. The force F2 is a force moving the cover member 100 to the cover position (a force attempting to close the cover member 100) and thus can suppress opening the cover member 100 when the developing device 42 is lifted up and can prevent the user, any other member, etc., from coming in contact with the developing roller.

According to the exemplary embodiments of the invention, the cover member 100 provided on the developing device 42 is at the cover position in a state in which the support member 41 can be drawn out from the main body case 2, namely, when the developing roller 42A is at the distant position. Thus, the user, any other member, etc., can be prevented from coming in contact with the developing roller when the user draws out or places the support member 41.

When the developing device 42 is detached from the support member 41 (developing device holder 41B), the cover member 100 is also at the cover position, so that the user, any other member, etc., can be prevented from coming in contact with the developing roller.

Thus, it becomes unnecessary for the user handling the color multifunction device 1 to take care to avoid touching of a hand or any other member on the developing roller 42A, so that usability when the user replaces the developing device can be enhanced.

Movement of the developing roller 42A between the distant position and the close position and movement of the cover member 100 between the cover position and the exposure position are associated with each other. Thus, in a single step, while the developing roller 42A is brought close to the photosensitive drum 32, the cover member 100 can be opened and the developing roller 42A can be exposed. Likewise, in a single step, while the developing roller 42A is brought away from the photosensitive drum 32, the cover member 100 can be closed and the developing roller 42A can be protected. Accordingly, operation when the developing device 42 is replaced can be simplified and the time required for replacing the developing device 42, namely, the time until image formation is made possible can be shortened, so that usability when the user replaces the developing device (operating comfortability) can be enhanced.

The developing roller 42A is placed above the developer accommodation unit 42D in a state in which the developing device 42 is attached to the support member 41. Thus, if no cover member is provided, the developing roller is exposed upward and thus the possibility that the user, any other member, etc., may come in contact with the developing roller when the user grasps the developing device increases. In the exemplary embodiment, the apparatus has the cover member 100 and when the support member 41 and the developing device 42 are detached, the developing roller 42A is protected, so that the user, any other member, etc., can be prevented from coming in contact with the developing roller 42A. That is, the invention is particularly effective for the configuration wherein the developing roller is placed at an upper part in a state in which the developing device is attached to the support member.

The grip 130 is provided on the cover member 100 in the configuration wherein the developing roller 42A is placed above the developer accommodation unit 42D. Thus, while the user, any other member, etc., is prevented from coming in contact with the developing roller 42A, the user can easily grasp the developing device 42.

Since the cover member move mechanism is made up of the projecting cover member operation part 104 provided for the cover member 100 and the abutment part 35 that the cover member operation part 104 abuts, provided on the photosensitive support frame 31, the cover member 100 can be moved between the cover position and the exposure position in association with the operation bar 80 (developing device move mechanism) according to the simple configuration.

The photosensitive support frame 31 includes the grooves 34 engaging the developing device 42 (roller shaft 140) and the abutment part 35 is formed integrally with the wall 34A forming the groove 34. Accordingly, a movement of the developing device 42 can be well guided by the groove 34 and the position of the developing device 42 (developing roller 42A) relative to the photosensitive drum 32 can also be determined with constant accuracy. The groove 34 and the abutment part 35 are formed integrally, so that the abutment part 35 can be easily formed and the position accuracy of the abutment part 35 relative to the developing device 42 (cover member 100) can be enhanced.

Since the cover member operation part 104 projects toward the outside in the axial direction of the developing roller 42A, when the cover member operation part 104 moves, it can be prevented from interfering with the photosensitive drum 32.

Modification to the Exemplary Embodiments

While the present invention has been shown and described with reference to certain exemplary embodiments thereof, it will be understood by those skilled in the art that various changes in form and details may be made therein without departing from the spirit and scope of the invention as defined by the appended claims In the above-described exemplary embodiment, the cover member move mechanism made up of the abutment part 35 provided on the photosensitive support frame 31 and the projecting cover member operation part 104 is illustrated, but the invention is not limited thereto. For example, in a configuration including a developing device move mechanism for allowing a developing device to move from a distant position to a close position by placing a support member in an apparatus main body, a member for guiding the support member provided in the apparatus main body may include an abutment part for abutting a cover member operation part and moving a cover member from a cover position to an exposure position. According to the configuration, the cover member can be moved from the cover position to the exposure position simply by placing the support member in the apparatus main body. That is, the operation bar 80 can be omitted. The cover member may move between the cover position and the exposure position under control in association with movement of the developing device between the distant position and the close position.

In the above-described exemplary embodiment, the configuration wherein the abutment part 35 is formed integrally with the groove 34 is shown, but the invention is not limited thereto. For example, the groove 34 and the abutment part 35 may be formed separately. The dimensions of the groove and the abutment part in the right-left direction may be the same or may be different.

In the above-described exemplary embodiment, the operation bar 80 made up of the bar main body 81 and the inclination members 82 is shown as an example of the developing device move mechanism, but the invention is not limited thereto. For example, the developing device move mechanism may be made up of an urging member for urging a developing device holder against a photosensitive member and an operation bar formed with a step on a lower face. According to the configuration, for example, as the operation bar moves back and forth, a recess part formed on the operation bar and an operation part projected from the developing device holder engage each other, whereby a developing device moves to a close position; the engagement of the recess part and the operation part is released, whereby the developing device moves to a distant position. As another example, a mode can also be adopted wherein as the operation bar moves back and forth, a convex part formed on the operation bar and an operation part engage each other, whereby a developing device moves to a distant position; the engagement of the convex part and the operation part is released, whereby the developing device moves to a close position.

In the above-described exemplary embodiment, the support member 41 including the developing device support frame 41A and the developing device holder 41B is illustrated, but the invention is not limited thereto. For example, the support member may be a support member for directly supporting a developing device with no developing device holder. In the above-described exemplary embodiment, the developing device holder 41B can swing relative to the developing device support frame 41A, but the invention is not limited thereto. For example, the developing device holder may be made slidable relative to the developing device support frame.

Figure 9A:
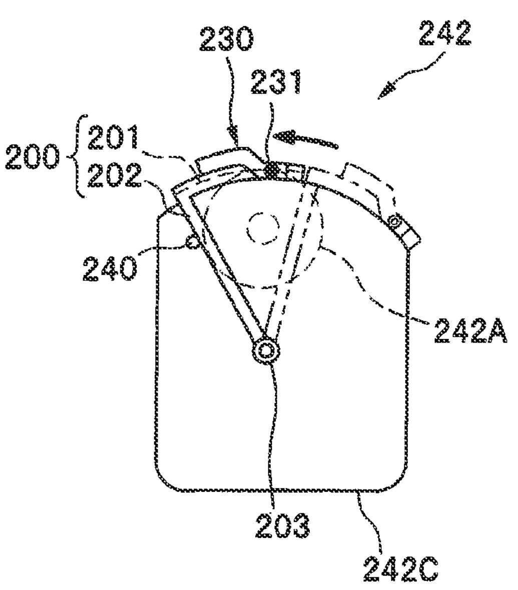
Figure 9B:
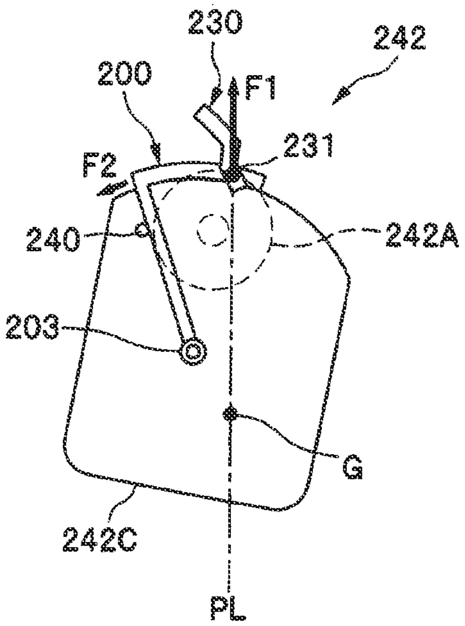

The desirable configuration of the developing device 42 shown in the above-described exemplary embodiment is not limited to the configuration shown in FIGS. 8A and 8B. For example, like a developing device 242 shown in FIGS. 9A and 9B, the shape of an arm 202 (side shape of a cover member 200) connecting a rotation shaft 203 of the cover member 200 and a support part 231 of a grip 230 may be different from the side shape of a cover member 100 described above. That is, the configuration of the developing device and the shapes of the components are not limited if the positional relationship among the rotation shaft, the support part, and the center of gravity satisfies the condition mentioned above.

A cover member abutment part for abutting when the cover member 200 moves from an exposure position (see the chain line in FIG. 9A) to a cover position (see the solid line in FIG. 9A) is not limited to the roller shaft 140 mentioned above. For example, the cover member abutment part may be a projection part 240 projecting from a side face of a developing device case 242C toward the outside. The position where the cover member abutment part is provided not limited if the positional relationship among the rotation shaft, the support part, and the center of gravity satisfies the condition mentioned above.

In the above-described exemplary embodiment, the cover member 100 can move between the cover position and the exposure position as it rotates along the circumferential direction of the developing roller 42A through the rotation shaft 103 relative to the developing device case 42C, but the invention is not limited thereto. For example, the cover member 100 may be able to move between the cover position and the exposure position as it slides relative to a developing device main body.

In the above-described exemplary embodiment, the configuration wherein the grip 130 is provided on the cover member 100 is shown, but the invention is not limited thereto. For example, a configuration wherein the grip is provided on the developing device main body may be adopted. No grip may be provided. To provide the grip, the configuration and the shape of the grip are not limited if the configuration and the shape allow the user to grasp the grip when attaching the developing device to the support member.

In the above-described exemplary embodiment, the developing device 42 including the developing roller 42A, the supply roller 42B, and the developer accommodation unit 42D is illustrated, but the invention is not limited thereto. For example, the developing device may have a configuration wherein the portion including the developing roller and the supply roller and the portion including the developer accommodation unit (developer accommodation unit) can be separated.

In the above-described exemplary embodiment, the photosensitive drum 32 is illustrated as an example of photosensitive member, but the invention is not limited thereto. For example, the photosensitive member may be a photosensitive belt.

In the above-described exemplary embodiment, the configuration wherein the photosensitive unit 30 and the developing unit 40 are drawn out to the front of the main body case 2 is shown, but the invention is not limited thereto. For example, the configuration may be a configuration wherein the photosensitive unit and the developing unit are drawn out from the left or the right of the apparatus main body.

In the above-described exemplary embodiment, the invention is applied to the image forming apparatus (color multifunction device 1) including the developing device 42 having the developing roller 42A placed above the developer accommodation unit 42D by way of example, but the invention is not limited to the example. That is, the invention can also be applied to an image forming apparatus including a developing device having a developing roller placed below a developer accommodation unit.

In the above-described exemplary embodiment, the color multifunction device 1 is shown as an example of image forming apparatus, but the invention is not limited to the example. That is, the invention can also be applied to a color copier, a color printer not including the flat bed scanner 3 (document reader), and the like. The image forming apparatus of the invention is not limited to an apparatus for exposing a photosensitive member to laser light and may be an apparatus for exposing a photosensitive member to light emitted from an LED (light emitting diode), an EL (electroluminescent) device, a phosphor, etc., for example.

In the invention, the expression "the developing roller is brought close to the photosensitive member" is not limited to the case where the developing roller and the photosensitive member are in contact with each other and also contains the case where the developing roller and the photosensitive member are not in contact with each other although they are near to each other so long as it is possible to develop the photosensitive member using the developing roller. That is, the invention can be applied to both an image forming apparatus of a contact developing system and an image forming apparatus of a non-contact developing system.

What is claimed is:

1. An image forming apparatus comprising:
- a main body case;
- a photosensitive drum;
- an intermediate transfer belt disposed above the photosensitive drum; and
- a developing device comprising:
  - a developing roller rotatable about an axis extending in a first direction, the developing roller being disposed below the photosensitive drum; and
  - a developer accommodating chamber configured to accommodate developer therein, the developer accommodating chamber being disposed below the photosensitive drum,
- wherein the main body case includes a developing device holder, the developing device holder configured to detachably support the developing device, the developing device holder configured to move between a first position in which the developing device is in a close position and a second position in which the developing device is in a distant position,
- wherein the developing roller is farther away from the photosensitive drum when the developing device is in the distant position than when the developing device is in the close position,
- wherein the main body case further includes a developing device support frame, the developing device support frame configured to movably support the developing device holder, and
- wherein the developing device support frame is movable relative to main body case in a second direction different from the first direction.

2. The image forming apparatus according to claim 1, wherein the developing device holder swings between the distant position and the close position with respect to the developing device support frame.

3. The image forming apparatus according to claim 1, further comprising a first guide portion configured to guide the developing device support frame in the second direction.

4. The image forming apparatus according to claim 1, further comprising a photosensitive support frame configured to support the photosensitive drum, the photosensitive support frame being movable relative to the main body case in the second direction.

5. The image forming apparatus according to claim 4, further comprising a second guide portion configured to guide the photosensitive support frame in the second direction.

6. The image forming apparatus according to claim 1, further comprising a developing device move mechanism configured to move the developing device holder upwardly to the first position from the second position.

7. The image forming apparatus according to claim 6, wherein the developing device move mechanism includes an engaging member engaging the developing device holder in the first position and a spring urging the engaging member upwardly.

8. The image forming apparatus according to claim 1, further comprising a lock configured to lock a movement of the developing device support frame relative to the main body case in a state where the developing device holder is in the first position.

9. The image forming apparatus according to claim 1, further comprising a developing device move mechanism configured to move the developing device holder upwardly to the first position from the second position,
- wherein the developing device support frame includes a hole, the developing device holder includes a projection projecting from the hole, and the developing device move mechanism is configured to engage the projection of the developing device holder and to move the developing device holder upwardly to the first position from the second position.

10. The image forming apparatus according to claim 1, further comprising a cleaning unit disposed above the intermediate transfer belt.

11. The image forming apparatus according to claim 1, further comprising a sheet feed cassette disposed below the developing device holder.

12. An image forming apparatus comprising:
- a main body case;
- a photosensitive drum;
- an intermediate transfer belt disposed above the photosensitive drum; and a developing device comprising:

a developing roller rotatable about an axis extending in a first direction, the developing roller being disposed below the photosensitive drum; and a developer accommodating chamber configured to accommodate developer therein, the developer accommodating chamber being disposed below the photosensitive drum, wherein the main body case includes a developing device holder, the developing device holder configured to detachably support the developing device, the developing device holder configured to move between a first position in which the developing device is in a close position and a second position in which the developing device is in a distant position, wherein the developing roller is farther away from the photosensitive drum when the developing device is in the distant position than when the developing device is in the close position, wherein the image forming apparatus further comprises a developing device move mechanism configured to move the developing device holder upwardly to the first position from the second position, and wherein the developing device move mechanism includes an engaging member engaging the developing device holder in the first position and a spring urging the engaging member upwardly.

13. The image forming apparatus according to claim 12, wherein the main body case further includes a developing device support frame, the developing device support frame configured to movably support the developing device holder.

14. The image forming apparatus according to claim 13, wherein the developing device holder swings between the distant position and the close position with respect to the developing device support frame.

15. The image forming apparatus according to claim 13, further comprising a lock configured to lock a movement of the developing device support frame relative to the main body case in a state where the developing device holder is in the first position.

16. The image forming apparatus according to claim 13, wherein the developing device support frame includes a hole, the developing device holder includes a projection projecting from the hole, and the developing device move mechanism is configured to engage the projection of the developing device holder and to move the developing device holder upwardly to the first position from the second position.

17. An image forming apparatus comprising:

a main body case;

a first photosensitive drum;

a second photosensitive drum;

an intermediate transfer belt disposed above the first and second photosensitive drums;

a first developing device;

a second developing device;

the first developing device comprising:

a first developing roller rotatable about an axis extending in a first direction, the first developing roller being disposed below the first photosensitive drum; and a first developer accommodating chamber configured to accommodate developer therein, the first developer accommodating chamber being disposed below the first photosensitive drum, the second developing device comprising:

a second developing roller rotatable about an axis extending in the first direction, the second developing roller being disposed below the second photosensitive drum; and a second developer accommodating chamber configured to accommodate the developer therein, the second developer accommodating chamber being disposed below the second photosensitive drum, wherein the main body case includes a first developing device holder and a second developing device holder, the first developing device holder configured to detachably support the first developing device, the second developing device holder configured to detachably support the second developing device, wherein the first developing device holder is configured to move between a first position in which the first developing device is in a close position and a second position in which the first developing device is in a distant position, wherein the second developing device holder is configured to move between a third position in which the second developing device is in the close position and a fourth position in which second developing device is in the distant position, wherein the first developing roller is farther away from the first photosensitive drum when the first developing device is in the distant position than when the first developing device is in the close position, wherein the second developing roller is farther away from the second photosensitive drum when the second developing device is in the distant position than when the second developing device is in the close position, and wherein the first developing device holder and the second developing device holder are configured to swing independently of each other.

18. The image forming apparatus according to claim 17, wherein the main body case further includes a developing device support frame, the developing device support frame configured to movably support the first developing device holder and the second developing device holder.

19. The image forming apparatus according to claim 18, wherein the first developing device holder is configured to swing between the distant position and the close position with respect to the developing device support frame, and wherein the second developing device holder is configured to swing between the distant position and the close position with respect to the developing device support frame.

20. The image forming apparatus according to claim 18, wherein the developing device support frame is movable relative to the main body case in a second direction different from the first direction.

* * * * *